(12) United States Patent
Bynum

(10) Patent No.: US 11,745,952 B1
(45) Date of Patent: Sep. 5, 2023

(54) MULTI-SECTIONED BOOM CONVEYOR ASSEMBLY HAVING HINGED TELESCOPING BOOM SECTION

(71) Applicant: Walter Bynum, Palm City, FL (US)

(72) Inventor: Walter Bynum, Palm City, FL (US)

( * ) Notice: Subject to any disclaimer, the term of this patent is extended or adjusted under 35 U.S.C. 154(b) by 0 days.

(21) Appl. No.: 18/086,297

(22) Filed: Dec. 21, 2022

(51) Int. Cl.
*B65G 41/00* (2006.01)
*B65G 21/12* (2006.01)
*B65G 21/14* (2006.01)
*B65G 15/22* (2006.01)
*B65G 47/18* (2006.01)
*B65G 15/26* (2006.01)

(52) U.S. Cl.
CPC ........... *B65G 41/005* (2013.01); *B65G 15/22* (2013.01); *B65G 15/26* (2013.01); *B65G 21/12* (2013.01); *B65G 21/14* (2013.01); *B65G 41/00* (2013.01); *B65G 47/18* (2013.01)

(58) Field of Classification Search
CPC ...... B65G 41/005; B65G 15/22; B65G 15/26; B65G 21/12; B65G 21/14; B65G 41/00; B65G 47/18
See application file for complete search history.

(56) References Cited

U.S. PATENT DOCUMENTS

| | | | |
|---|---|---|---|
| 3,151,732 A | 10/1964 | Oury et al. | |
| 4,624,357 A | 11/1986 | Oury et al. | |
| 4,646,906 A | 3/1987 | Wilcox, Jr. | |
| 5,123,519 A * | 6/1992 | Reninger | B65G 65/28 198/861.2 |
| 5,634,545 A | 6/1997 | Plumley | |
| 6,378,686 B1 | 4/2002 | Mayer | |
| 6,431,346 B1 | 8/2002 | Gilmore et al. | |
| 6,471,031 B1 | 10/2002 | Duncalf | |
| 6,929,113 B1 * | 8/2005 | Hoover | B65G 21/14 198/588 |
| 7,108,125 B2 | 9/2006 | Gilmore et al. | |
| 8,881,887 B2 * | 11/2014 | Jorgensen | B65G 21/14 198/581 |
| 8,985,301 B2 | 3/2015 | Werlinger | |
| 9,828,184 B1 | 11/2017 | Bynum | |
| 9,969,558 B1 | 5/2018 | Bynum | |
| 10,183,811 B1 * | 1/2019 | McCloskey | B62D 13/005 |
| 10,196,215 B2 | 2/2019 | Buckmeier et al. | |
| 10,399,785 B1 * | 9/2019 | Fike | B65G 41/002 |
| 10,518,982 B1 | 12/2019 | Fike et al. | |
| 11,187,001 B1 * | 11/2021 | Bynum | B65G 47/44 |
| 11,459,193 B1 * | 10/2022 | Rice | B65G 41/002 |
| 2010/0135758 A1 | 6/2010 | Gallione et al. | |
| 2013/0118862 A1 | 5/2013 | Stewart | |
| 2019/0210807 A1 | 7/2019 | Kornelsen et al. | |

* cited by examiner

*Primary Examiner* — Mark A Deuble
(74) *Attorney, Agent, or Firm* — The Concept Law Group, PA; Scott M. Garrett; Scott D. Smiley

(57) ABSTRACT

A portable multi-sectioned boom conveyor assembly includes a main conveyor boom section and a distal conveyor boom section. The distal conveyor boom section is hinged, relative to the main conveyor boom section, so that the distal conveyor boom section can be adjusted in order to provide material to a desired location.

12 Claims, 23 Drawing Sheets

MULTI-SECTIONED BOOM CONVEYOR ASSEMBLY HAVING HINGED TELESCOPING BOOM SECTION

FIELD OF THE INVENTION

The present invention relates generally to portable assemblies used to convey material to a placement location, and, more particularly, relates to vehicles having a multi-sectioned boom with a conveyor used to move material to the placement location wherein a distal section of the multi-sectioned boom is attached to a main or intermediate section of the boom.

BACKGROUND OF THE INVENTION

There are many operations in industry that involve the movement of material from a portable source (e.g. a truck) to a placement location. Once example of such a material is construction material such as concrete, which is employed in the construction of buildings, parking garages, and other structures, is that it must be created and applied within a relatively short time frame. Typically, concrete is transported by, for example, a concrete mixing truck to a construction site where it is pumped to a placement or installation location at the construction site. Alternatively, concrete may also be mixed at the construction site and pumped to the placement location. To move the concrete to the desired location, it is pumped through a pipeline. As a result, the concrete is under high pressure, which has the potential to cause accidents, and does in some cases.

To convey concrete to the placement location while at a construction site, some known assemblies, such as those commercially sold by the company, Putzmeister, utilize a trailer or truck having multiple extendable and articulating boom sections acting as a frame for a conduit or piping carrying the concrete to a placement location. These multiple extendable boom sections are sometimes referred to as a "main conveyor" or "boom pipeline." To get the concrete to the boom pipeline, these assemblies utilize a pumping system to transport the concrete to the placement location. These boom sections are pivotally coupled with respect to one another and are operable to have a single degree of freedom with respect to a single joint in which two individual boom sections are coupled. Over the length of the boom pipeline, the multiple boom sections combine to have multiple degrees of freedom, yet they are still problematically limited to a single access of movement, i.e., vertically, with respect to one another. As such, to navigate to the boom pipeline horizontally the entire boom pipeline is required to be rotated with respect to the base of boom pipeline and the trailer/truck (hereinafter "boom pipeline turret"). This presents multiple problems to users having concrete placement locations within tight and/or compact confines and/or construction sites where power and/or telephone lines are present. Readjusting the length or position of the boom pipeline, whether it be by horizontal movement about the boom pipeline turret or by pivoting individual boom sections with respect to one another, can also be a cost-, time-, and/or labor-intensive endeavor.

These above-described conduit-based pumping systems are also problematic in that they require specific concrete mixtures in order for the concrete to flow through the conduit, unlike telescopic booms utilizing belt conveyors such as those commercially marketed by Putzmetizer under the trademark Telebelt and as described in U.S. Pat. Nos. 4,624,357, 6,431,346, 8,662,291 (wherein the entirety of said descriptions are incorporated herein by reference). Moreover, those conduit-based pumping systems are also problematic in that they generally require more power to operate and, should the pump break and/or malfunction, also typically require the entire conduit to be replaced. Furthermore, there are significant safety issues associated with pumping systems as they can become over-pressurized, or acquire an air bubble in the line, and generate a condition called "hose whip" where the terminal end of the delivery system violently whips in response to the sudden, explosive release of pressurized air. This has caused numerous injuries and fatalities. Furthermore, there is considerable waste in pump systems as the concrete in the pipeline that is not dispensed needs to be washed out of the pipeline.

Many of the known belt conveyors also present problems to users because they too require rotation of the main conveyor at the main conveyor base joint to place and/or deliver the concrete to the user and/or maneuver the end hose attached to the distal end of the main conveyor. Moreover, those known telescopic belt conveyors telescope the main conveyor by extending and retracting a plurality of boom sections within one another, each with their own belt. Therefore, vertical adjustment of one or more of the main boom sections is unavailable unless the user vertically adjusts the main conveyor about the main conveyor base joint, which can be cost- and time-intensive. Another problem with belt conveyor systems is that they require the boom sections to somewhat coplanar. The boom sections can rotate in a plane with respect to each other, but not change angles.

Another problem with existing conveyor systems is that it has been found that having the distal boom section at an angle (i.e. not level) while delivering material raises the point of placement apparatus at the end of the distal section, such that the material being carried on the distal boom section is raised above the desired point of placement and will be too high to place the material.

Therefore, a need exists to overcome the problems with the prior art as discussed above.

SUMMARY OF THE INVENTION

In accordance with some embodiments of the inventive disclosure, there is provided a portable multi-sectioned boom conveyor assembly that includes a main conveyor boom section with a first main conveyor belt and a first end rotatable about a main conveyor base joint. The main conveyor section has a distal end. The assembly further includes a transfer chute section mounted at the distal end of the main conveyor boom section that is situated to receive material from the first main conveyor belt and direct the material downward. The assembly further includes a rotatable pass through section having an upper portion and a lower portion. The lower portion is coupled to the upper portion about a revolution joint that allows the lower portion to rotate with respect to the upper portion, and the upper portion is coupled to the transfer chute section in a hinged manner. The assembly further includes a distal conveyor boom section that is coupled to the lower portion of the rotatable pass through section. The distal conveyor boom section having a second main conveyor belt spanning from a first end of the distal conveyor boom section to a second end of the distal conveyor boom section. The assembly further includes a feeder conveyor with a belt operably configured to transport the material to the first main conveyor belt at the first end of the proximal main conveyor boom section. The first and second main conveyor belts are operably configured to cooperatively transport the material toward the second end of the distal conveyor boom section.

In accordance with a further feature, the top portion of the rotatable pass through section has a hinge bracket that is coupled to a hinge bracket of the transfer chute section such the transfer chute section and rotatable pass through section pivot about their respective hinge brackets.

In accordance with a further feature, the assembly further includes a bracket at the top portion of the rotatable pass through section, a bracket at the transfer chute section, and an actuator coupled between the bracket at the top portion of the rotatable pass through section and the bracket at the transfer chute section.

In accordance with a further feature, the actuator is operable to adjust an angle of the distal conveyor boom section relative to the main conveyor boom section when the main boom section is raised at an angle relative to level such that the distal conveyor boom section is level.

In accordance with a further feature, the assembly further includes an actuator mounted on the lower portion of the rotatable pass through section that forms a ring that encircles the top portion of the rotatable pass through section, an actuator mounted on the transfer chute section that drives the actuator on the lower portion. The actuator on the transfer chute is operable to drive the actuator on the lower portion to cause the distal conveyor boom section to rotate between a position where the distal conveyor boom section is under main conveyor boom section, and an extended position where the distal conveyor boom section is extended forward of the main conveyor boom section.

In accordance with a further feature, an angle of the distal conveyor boom section relative to the main conveyor boom section can be adjusted.

In accordance with some embodiments of the inventive disclosure, there is provided a portable multi-sectioned boom conveyor assembly which includes a main conveyor boom section having at least one fixed portion and at least one extendible portion arranged in a telescoping arrangement, wherein the main conveyor boom section has a first main conveyor belt and a distal end. The assembly further includes a transfer chute section mounted at the distal end of the main conveyor boom section that is positioned to receive material from the first main conveyor belt and direct the material downward. The assembly further includes a rotatable pass through section having an upper portion and a lower portion. The lower portion is coupled to the upper portion about a revolution joint that allows the lower portion to rotate with respect to the upper portion. The upper portion is coupled to the transfer chute section in a hinged manner. The rotatable pass through section is configured to allow material passing through the transfer chute section to also pass through the rotatable pass through section. The assembly further includes a distal conveyor boom section that is coupled to the lower portion of the rotatable pass through section, the distal conveyor boom section having a second main conveyor belt spanning from a first end of the distal conveyor boom section to a second end of the distal conveyor boom section. The distal conveyor boom section is movable between a position under the main conveyor boom section and an extended position in which the distal conveyor boom section is extended forward of the distal end of the main conveyor boom section.

In accordance with a further feature, the top portion of the rotatable pass through section has a hinge bracket that is coupled to a hinge bracket of the transfer chute section such the transfer chute section and rotatable pass through section pivot about their respective hinge brackets.

In accordance with a further feature, the assembly further includes a bracket at the top portion of the rotatable pass through section, a bracket at the transfer chute section, an actuator coupled between the bracket at the top portion of the rotatable pass through section and the bracket at the transfer chute section.

In accordance with a further feature, the actuator is operable to adjust an angle of the distal conveyor boom section relative to the main conveyor boom section when the main boom section is raised at an angle relative to level such that the distal conveyor boom section is level.

In accordance with a further feature, the assembly further includes an actuator on the lower portion of the rotatable pass through section, an actuator mounted on the transfer chute section that drives the actuator on the lower portion. The actuator mounted on the transfer chute is operable to drive the actuator on the lower section to cause the distal conveyor boom section to rotate between the travel position and the extended position.

In accordance with a further feature, an angle of the distal conveyor boom section relative to the main conveyor boom section can be adjusted.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the main conveyor.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention. The assembly and components depicted within the figures are not (unless otherwise expressly identified) to scale.

DETAILED DESCRIPTION

Figure 1:
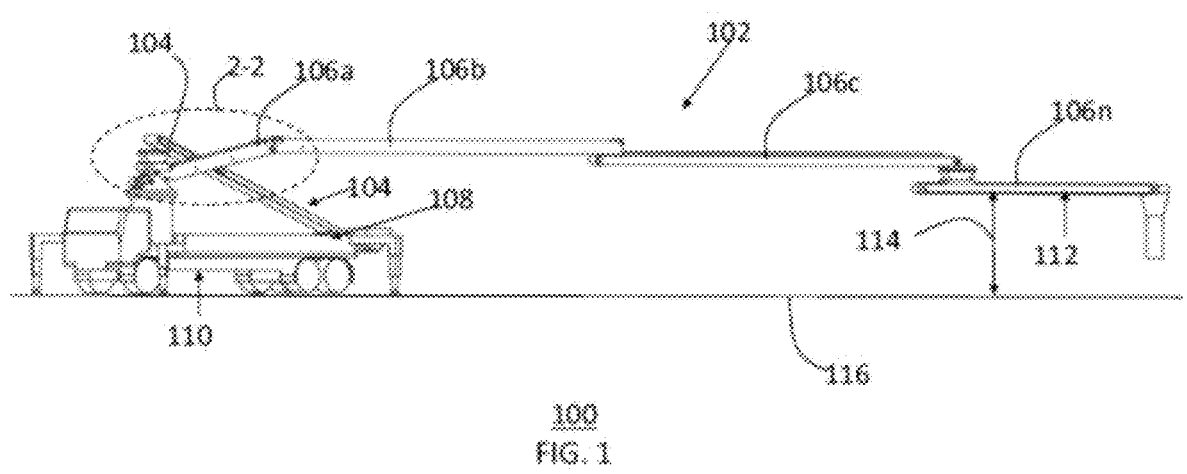
FIG. 1 is an elevational side view of a portable multi-sectioned boom conveyor assembly in an extended position along a boom extension path in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient portable multi-sectioned boom conveyor assembly 100 generally having a main conveyor boom assembly 102 and a feeder conveyor 104, as depicted in FIG. 1 illustrating one embodiment of the present invention. FIG. 1 shows several advantageous features of the present invention, but, as will be described below, the invention can be provided in several shapes, sizes, combinations of features and components, and varying numbers and functions of the components. The assembly 100 is portable in that it can be transported from location to location on a vehicle, such as a motorized truck or a trailer for easy placement of a material, such as concrete. Beneficially, a plurality of main boom sections 106a-n (wherein the letter "n" represents any number greater than 1) of the main conveyor boom assembly 102 are operable to extend, retract, and vertically adjust with respect to one another. In one embodiment, this retraction and extension is telescopic translation, as depicted in the figures, and as previous known by those of skill in the art—as discussed in references cited in the Background. Moreover, a distal main conveyor boom section (reflected as 106n in FIG. 1) is also beneficially operable to revolve with respect to an adjacent main boom section coupled thereto. As such, the material conveyor assembly 100 has more effective and efficient maneuverability than those known assemblies.

Figure 2:
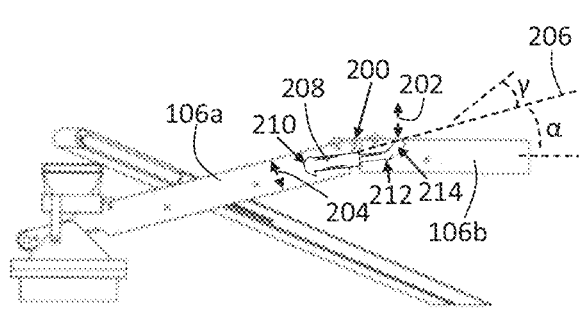
FIG. 2 is a close-up view of section 2-2 of the assembly of FIG. 1.
Figure 3:
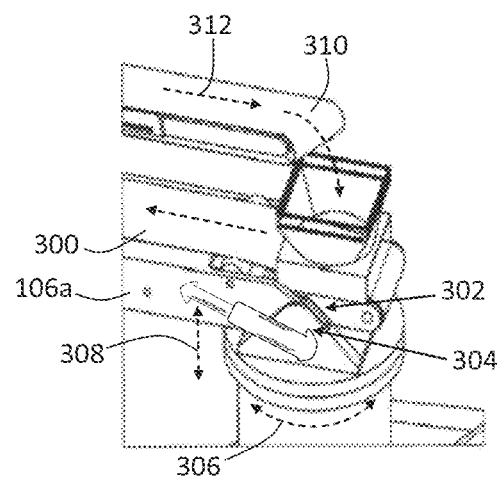
FIG. 3 is a partial downward looking perspective view of a feeder belt and the main boom section of FIG. 1.

With reference now to FIGS. 1-3 and to facilitate in accomplishing the advantageous maneuverability, the main conveyor boom assembly 102 includes a first main conveyor belt 300 and a first end 302 that can be configured to be rotatably coupled to a deck 108 of a vehicle 110 about a main conveyor base joint 304 so that the main conveyor boom assembly 102 may rotate as a single unit, if desired. The vehicle 110 is one platform on which the main conveyor boom assembly 102 can be supported, but those of skill in the art will appreciate that the main conveyor boom assembly 102 can equivalently be mounted on, for example, a trailer, a crane, a barge, and other such platforms capable of supporting the main conveyor boom assembly 102. In one embodiment, the main conveyor boom assembly 102 also includes an intermediate main conveyor boom section 106c and a second intermediate main conveyor boom section 106b interposed between the intermediate main conveyor boom section 106c and the proximal main conveyor boom section 106a. Other main boom sections 106a-n may also be utilized as intermediate main conveyor boom sections depending on the desired reach of the main conveyor boom assembly 102 and the spatial limitations associated with the length between one or more upper surfaces of the deck 108 of the vehicle 110 and a bottom surface 112 of the distal main conveyor boom section 106n when the main conveyor boom assembly 102 is placed in a storing position along a boom extension path. Said another way, the storing position is a configuration with the main boom sections 106a-n in an overlapping relationship with one another substantially along their respective lengths such that the main boom sections 106a-n can be transported. When the assembly 100 utilizes a feeder conveyor 104 mechanically coupled to the deck 108 of the vehicle 110, the storing position would also include the deck 108 having sufficient spatial capacity to receive the length of the feeder conveyor 104, i.e., as best shown in FIG. 4, from a proximal end 400 of the feeder conveyor 104 to a distal end 402 of the feeder conveyor 104.

In one embodiment, the proximal main conveyor boom section 106a may be pivotally coupled to the main conveyor base joint 304 and operably configured to rotate in a horizontal plane (wherein said rotation is represented by arrows 306) and in a vertical plane (wherein said rotation is represented by arrows 308). As discussed in the prior-art references cited in the Background section, this horizontal and vertical rotation may be accomplished by employing various electrical and mechanical components, e.g., actuators and motors, known by those of skill in the art to translate main boom sections. In one embodiment, the feeder conveyor 104 may be advantageously coupled to a deck joint 900 (shown best in FIG. 9) disposed at a distal end 902 of the deck 108 of the vehicle 110 so the assembly 100 can be utilized with minimal time and costs attributed to the user, and stored with minimal effort from the user. The feeder assembly 104 may be maneuvered into place manually or with the use of actuators and/or motors. The use of the term "end" (whether distal, proximal, or otherwise) does not indicate the referencing object's terminal end, unless specifically specified; rather, it means a location or area at or adjacent to the object's terminal end. In other embodiments, the feeder conveyor 104 may be employed by a user without it being coupled to the vehicle 110 or with it being coupled in another location on the vehicle 110.

Figure 4:
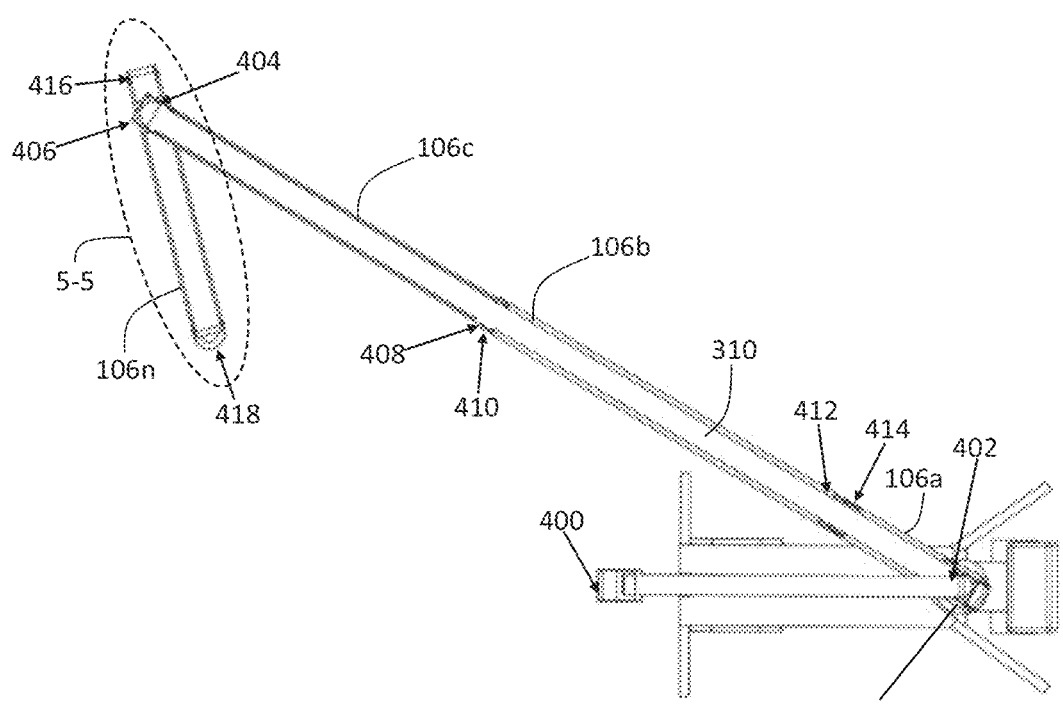
FIG. 4 is a top plan view of the assembly of FIG. 1.
Figure 9:
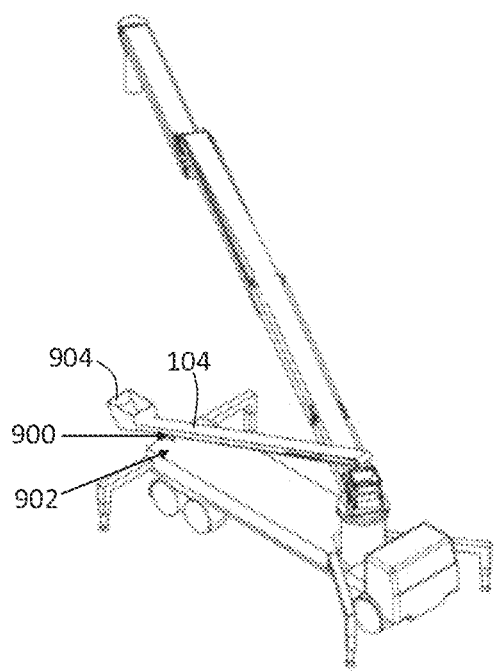
FIG. 9 is a downward-looking perspective view of the assembly of FIG. 8.

With reference to FIGS. 3, 4, and 9, the feeder conveyor 104 is preferably pivotably coupled to the deck pivot joint 900 such that the pivot joint 900 acts a fulcrum and permits the feeder conveyor 104 to be placed in various positions. The feeder conveyor 104 may also include a hopper 904 with a lower end disposed at the proximal or first end 400 of the feeder conveyor 104. The feeder conveyor 104 is operably configured to transport the material from the hopper 904 toward the distal end 402 of the feeder conveyor 104 via, for example, a belt 310. The feeder conveyor 104 may also include an operational position along a feeder conveyor placement path, wherein the operational position includes the distal end 402 of the feeder conveyor 104 in a superimposed configuration with respect to the first end 302 of the proximal main conveyor boom section 106a and the first main conveyor belt 300, as best shown in FIG. 3. The proximal main conveyor boom section 106a may also have a hopper for receiving the material and relaying the material to the main conveyor belt 300. The flow direction of the material can be shown in FIG. 3 with the arrows 312.

With reference to FIGS. 4-8, the boom assembly 100 includes a distal main conveyor boom section 106n that is rotatably coupled to one of the plurality of main conveyor boom sections 106a-n about a revolution joint 404, and that is supported a distance 114 above a ground surface 116 by the vehicle 110. In one embodiment, the distal main conveyor boom section 106n is rotatably and directly coupled to the intermediate main conveyor boom section 106c. The direct coupling connection, through the revolution joint, may be at the second end 406 of the intermediate main conveyor boom section 106c. In other embodiments, should additional or less booms sections be desired, the distal main conveyor boom section 106n may be rotatably and directly coupled to another intermediate section disposed at the sequential end of the boom sections. The intermediate main conveyor boom section 106c includes a first end 408 translatably coupled to the proximal main conveyor boom section 106a. Similarly, the second intermediate main conveyor boom section 106b may also include a first end 412 translatably coupled to the proximal main conveyor boom section 106a. The second intermediate main conveyor boom section 106b also includes a second end 410 in which the intermediate main conveyor boom section 106c translates with respect to. The second intermediate main conveyor boom section 106b also includes a first end 412 that may be translatably coupled, e.g., rotated and/or pivoted, with respect to second end 414 of the proximal main conveyor boom section 106a. In one embodiment, the revolution joint 404 is disposed at the first end 416 of the distal main conveyor boom section 106n, while in other embodiments, it may be disposed in other locations along a length of the distal main conveyor boom section 106n.

With specific reference briefly to FIGS. 2 and 4, in one embodiment, the proximal main conveyor boom section 106a is directly and pivotably coupled with respect to the second intermediate main conveyor boom section 106b about a pivot joint 200 disposed, for example, proximal to the top surface of the frames of the proximal and second intermediate main conveyor boom sections 106a-b. In one embodiment, the two main conveyor boom sections 106a-b are rotatably coupled together with a rod/pin—acting as a fulcrum, wherein the second intermediate main conveyor boom section 106b is operably configured to pivot in a vertical direction (or in the y-axis—represented with arrow 202) with respect to the proximal main conveyor boom sections 106a. The rod/pin extends from one side surface of the frame to the other side surface. The distal end 414 of the proximal main conveyor boom section 106a, or the proximal end 412 of the second intermediate main conveyor boom section 106b, has a thickness (represented with arrow 204) at the distal end 414 and accommodates negative angular movement, a, relative to the generally planar axis 206 defined by the generally longitudinal orientation of the proximal main conveyor boom section 106a. In one embodiment, the second intermediate main conveyor boom section 106b has a negative angular deviation ranging from approximately 40-45°. The second intermediate main conveyor boom section 106b may also have positive angular deviation, γ, ranging from approximately 20-25°. Other potential ranges, however, may be utilized. As such, the main conveyor boom sections 106b-n may be adjusted vertically about the pivot joint 200 to accommodate various structural roadblocks present at many construction or job sites and/or to effectively and efficiently reach the material placement location without adjusting the feeder assembly 104 or the proximal main conveyor boom section 106a.

To move the main conveyor boom sections 106b-n about the pivot joint 200, the assembly 100 may utilize one or more mechanical drivers, such as pneumatic, electrical, thermal, magnetic, mechanical, or hydraulic actuators, e.g., driver/actuator 208. In one embodiment, the base 210 of the actuator 208 may be mechanically coupled (e.g., utilizing one or more fasteners) to the second end 414 of the proximal main conveyor boom section 106a and operably configured to rotate, for example on ball bearings, within a housing and the distal end 212 of the actuator 208 may be operably configured to extend and retract within a track 214 sized to receive the distal end 212 of the actuator 208 and shaped to permit the distal end 212 to translate and vertically adjust the adjacently coupled main conveyor boom section. In other embodiments, the assembly 100 may utilize another type of mechanical driver, e.g., a cable/pulley configuration, in order to provide the necessary force to rotate the second intermediate main conveyor boom section 106b with respect to the proximal main conveyor boom section 106a.

Figure 13:
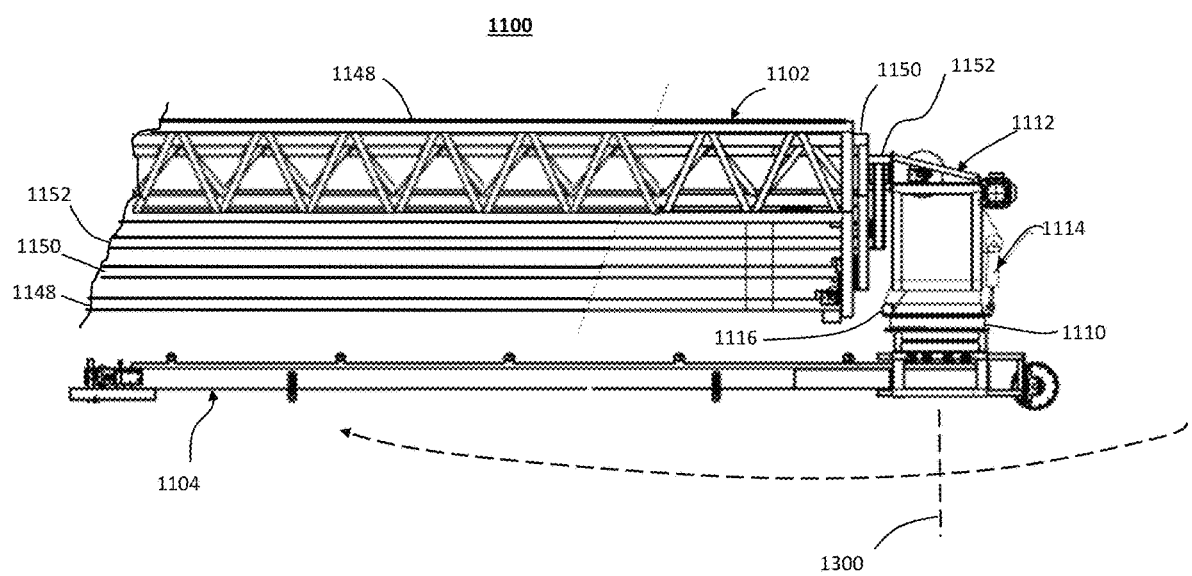
FIG. 13 shows a side view of a portable multi-sectioned boom conveyor assembly having a hinge between boom sections, in a travel configuration, also a belting configuration.

With reference back to FIGS. 4-8, in one embodiment, the translation is telescopic translation in the longitudinal direction, as known by those of skill in the art. In other embodiments, the translation may also include pivoting or other vertical adjusting of the boom sections and/or a combination of telescopic translation and pivoting or vertical adjustment. Referring briefly back to FIG. 1 in combination with FIG. 4, in one embodiment two or more main boom sections are telescopically coupled together such that they extend and retract in a "closed-stacked" relationship. Specifically, two main boom sections, e.g., 106b-c, may be coupled together through, for example, a tongue-and-groove or roller/wheel-track configuration, wherein one or both of the two main boom sections 106b-c are operable to telescopically translate in a longitudinal direction with respect to one another. Further, as seen depicted in FIG. 1, the two main boom sections 106b-c are stacked on top of one another, which provides greater structural rigidity and support while one of the two main boom sections 106b-c is translating to the desired position. In other embodiments, the boom can be designed like a crane boom, with boom sections being arranged as shown in FIG. 13. Tensioning of the main conveyor belt 300 through boom section translation may occur with known techniques and using known components, such as those described in the references cited in the Background section and, for example, in U.S. Pat. No. 7,108,125 (Gilmore et al.) (wherein the entirety of said reference is incorporated herein by reference). Therefore, in one embodiment, the main conveyor belt 300 is beneficially a single belt that revolves around the main boom sections 106a-c using, for example, rollers and motors. Said another way, the belts 300 may be described as being revolvably coupled to the respective boom sections 106a-c. In some embodiments, the main conveyor belt 300 is composed of a plurality of belts independently revolving around their respective one or more main boom sections 106a-c. In some embodiments the boom include truss type boom sections for the first and second sections, and a closed type distal boom section.

With reference briefly to FIGS. 2-4, the main conveyor boom sections 106a-n may also have "structurally closed frames." The boom sections 106a-n are considered to have structurally closed frames such that they substantially no openings along their respective lengths aside from those used to permit the revolution of the rollers or movement of any other components, e.g., actuators, used to maneuver the main conveyor boom sections 106a-n. These structurally closed frames advantageously create a more structurally rigid and secure main conveyor boom assembly.

With reference back to FIGS. 4-8, the distal main conveyor boom section 106n includes a second main conveyor belt 500 spanning from a first end 416 of the distal main conveyor boom section 106n to a second end 418 of the distal main conveyor boom section 106n. The second main conveyor belt 500 independently revolves around the distal main conveyor boom section 106n, as the distal main conveyor boom section 106n, more particularly the second end 418, is operably configured to independently revolve, approximately 360°, about the revolution joint 404. The first and second main conveyor belts 300, 500 are operably configured to transport the material toward the second end 418 of the distal main conveyor boom section 106n, where it may pass through an end hose 502 and ultimately placed in the desired location by the user. The material directional flow from the intermediate main conveyor boom section 106c, to the distal main conveyor boom section 106n, and then through the end hose 502 can be seen depicted with arrows 504 in FIG. 5.

Figure 5:
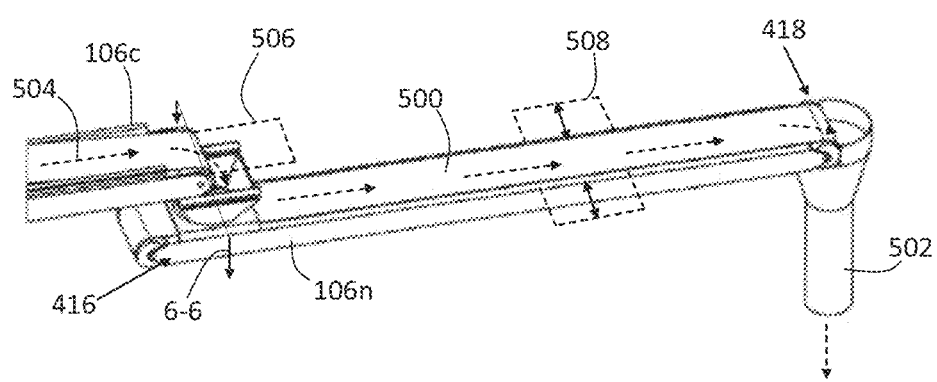
FIG. 5 is a close-up fragmentary view of section 5-5 of the assembly in FIG. 4 with a distal main boom of the main conveyor disposed in a generally longitudinal orientation in accordance with one embodiment of the present invention.
Figure 6:
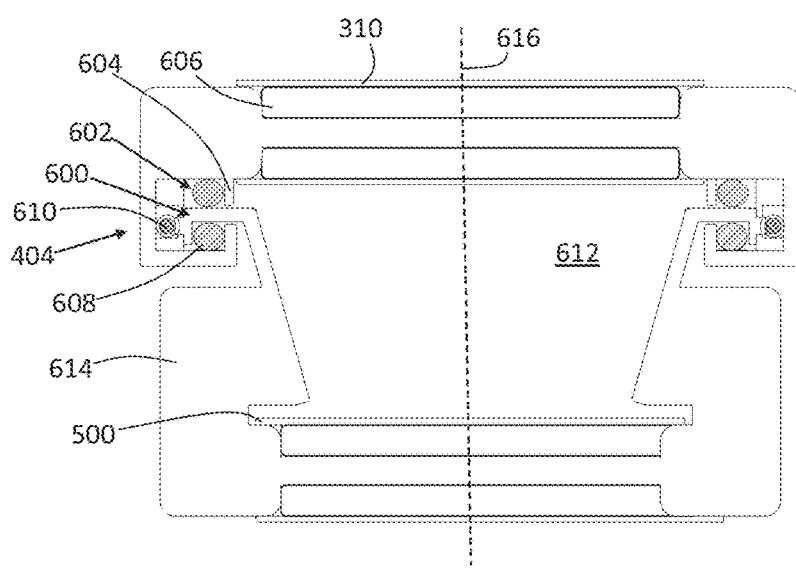
FIG. 6 is a fragmentary cross-sectional view of the assembly in FIG. 5 about section line 6-6.
Figure 7:
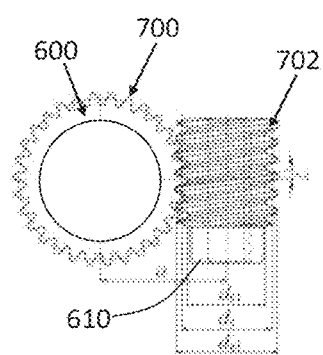
FIG. 7 is a fragmentary view of an exemplary worm gear configuration used to revolve the distal main boom section.
Figure 8:
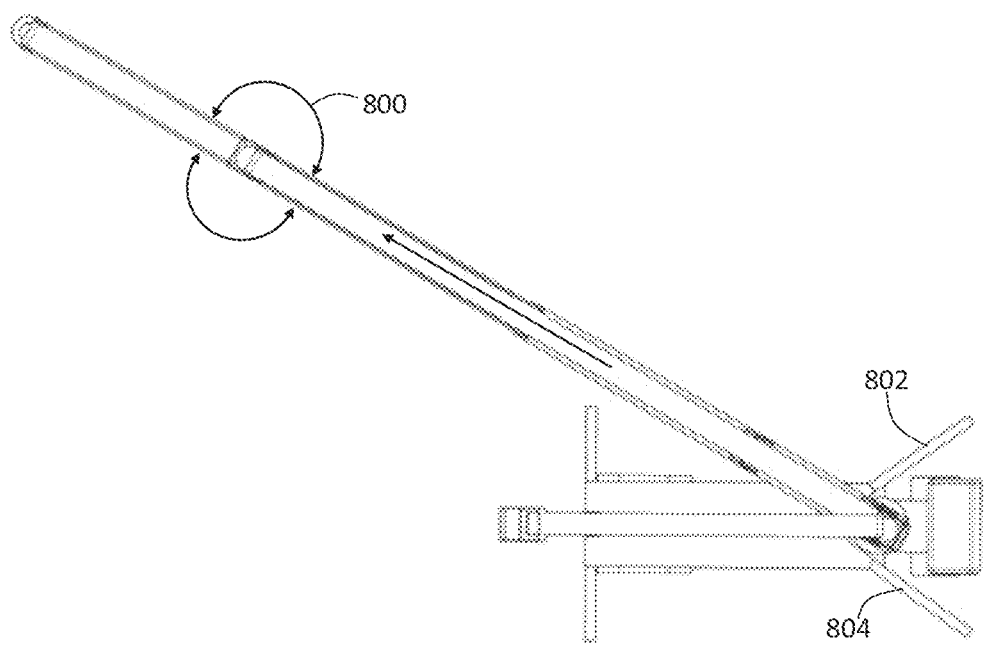
FIG. 8 is a top plan view of the conveyor assembly with a distal main boom of the main conveyor disposed in a generally longitudinal orientation in accordance with one embodiment of the present invention.

The distal main conveyor boom section 106n is operable to rotate approximately 360° using, for example, a coupling configuration best shown in FIG. 6. FIG. 6 depicts a cross-section view of the revolution joint 404 about section line 6-6 depicted in FIG. 5. An exemplary rotation path of the distal main conveyor boom section 106n is depicted in FIG. 8 with arrows 800. For example, the first end 416 of the distal main conveyor boom section 106n may have an upper annual portion 600 with teeth 700 surrounding a perimeter of the annual portion 600. The teeth 700 may be coupled to a drive axle 610 also having teeth 702 corresponding to the teeth of the annual portion 600. FIG. 7 depicts a top plan view of an exemplary axial module worm gear pair. In other embodiments, the distal main conveyor boom section 106n may revolve about the revolution joint 404 using a tongue-and-groove configuration or a cable/pully configuration, or one or more hydraulic actuators The annual portion 600 may have an upper portion that seats within a channel 602 defined by a lower end of the second end 406, specifically a frame member 604, of the intermediate main conveyor boom section 106c. As those of skill in the art will appreciate, the frame member 604 of the intermediate main conveyor boom section 106c flanks the first main conveyor belt 300 so that it can revolve about the respective boom sections and rollers, e.g., roller 606, disposed thereon. Said another way, the first main conveyor belt 300 may span from the from the first end 302 of the proximal main conveyor boom section 106a to a second end 406 of the intermediate main conveyor boom section 106c, wherein the first main conveyor belt 300 is operably configured to revolve around the proximal main conveyor boom section 106a, the intermediate main conveyor boom section 106c, and the second intermediate main conveyor boom section 106b. The axial module worm gear pair may have various root diameters, $d_{f1}$, reference diameters, $d_1$, tip diameters, $d_{a1}$, center distances, a, and lead angles, γ, depending on the design constraints and parameters.

The rotation of the distal main conveyor boom section 106n may also be described or limited in terms of its axis or plane of rotation. For example, the first main conveyor belt 300 disposed on the intermediate main conveyor boom section 106c may define a belt plane (represented with numeral 506 in FIG. 5). The distal main conveyor boom section 106n may revolve about an axis of revolution (represented with numeral 616 in FIG. 6) defined by the center of rotation of the distal main conveyor boom section 106n about the revolution joint 404. The rotation of the distal main conveyor boom section 106n may then be described by the axis of revolution 616 being disposed at an approximately orthogonal orientation (i.e., 90°+/−5°) with respect to the belt plane 506. Alternatively, the rotation of the distal main conveyor boom section 106n may be described as generating a distal main conveyor boom section rotation plane (represented with numeral 508 in FIG. 5) that is substantially parallel to, yet non-co-planar with, the belt plane 506.

When the user desires to rotate the distal main conveyor boom section 106n, in one embodiment, the distal main conveyor boom section 106n may be operable for it to be manually maneuvered to the desired position. In such an embodiment, the axial module worm gear pair may be omitted, and the distal main conveyor boom section 106n would be supported by and operable to rotate through the use of one more ball bearings 608. The distal main conveyor boom section 106n would also have a manual or electronic locking member that would be operably configured to prohibit rotation of the distal main conveyor boom section 106n when desired. In other embodiments, the axial module worm gear pair or other driving mechanisms and configurations may be rotated using, for example, a motor, driver, and/or gear box that may have various designs and outputs, including torque and velocity, depending on the design constraints and parameters.

As such, the multi-sectioned boom conveyor assembly 100 is operable to transport material to a placement location in a continuous fashion, while simultaneously providing the user the ability to maneuver the end hose 502 to the desired location for effective and efficient placement of the material, e.g., dirt, concrete, or other material, e.g., wheat/corn. Specifically, as shown in FIGS. 5-6, the material would transport through the intermediate main conveyor boom section 106c via the first main conveyor belt 300, through a joint aperture 612 defined by a portion of the frame 614 of the distal main conveyor boom section 106n, and then onto the second main conveyor belt 500 where it is ultimately transported to the end hose 502 and placement location desired by the user.

Figure 10:
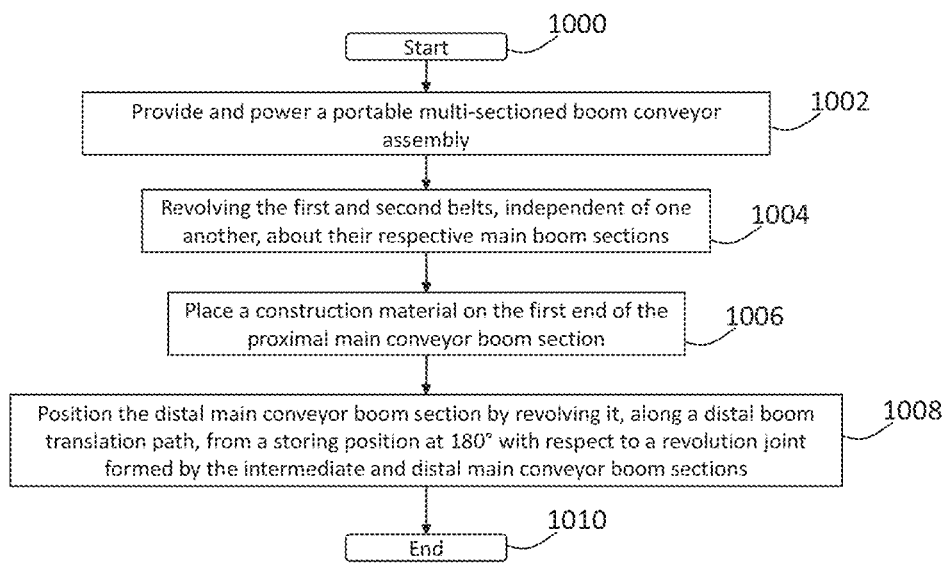
FIG. 10 is a process-flow diagram depicting an exemplary method of placing a material.

With reference to FIG. 10, a process flow diagram is depicted that represents one exemplary and beneficial method of placing material. Although FIG. 10 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 10 for the sake of brevity. In some embodiments, some or all of the process steps included in FIG. 10 can be combined into a single process. The process begins at step 1000 and immediately proceeds to step 1002 of providing and powering the assembly. The boom can be extended, or used in an unextended configuration. Before using the distal main conveyor boom section 106n, those of skill in the art will appreciate that other steps may be taken before such action, e.g., installing and/or positioning one or more outriggers 802, 804, which are depicted in at least FIG. 8. In some embodiments, the overall length of the plurality of main boom sections 106a-n may range from 40-200 feet. Each of the plurality of main boom sections 106a-n may be approximately 30-50 feet in length, while the width of each section (from frame-to-frame flanking the belt) may range from 2-6 feet. Each of the plurality of main boom sections 106a-n may also have a height (from upper belt surface-to-lower belt surface) range from approximately 1-6 feet. In some embodiments these dimensions can be outside of these ranges, depending on the application.

Next, the process continues to step 1004 of revolving the first and second belts 300, 500 around their respective main boom sections. Said another way, the assembly 100 may provide power to one or more motors operably configured to revolve the belts 300, 500 around the respective boom sections 106a-n. Further, a the feeder conveyor belt 310 can also be started. When a belt is disposed on the upper side or above of one of the boom sections 106a-n, it is described as an upper belt surface, as opposed to when the belt is disposed underneath one of the booms sections 106a-n, it is described as a lower-belt surface. As mentioned, should the assembly 100 be used in combination with a feeder conveyor 104, the user would also start revolving the feeder conveyor belt 310 as well. Next, the process continues to step 1006 of placing a material, e.g., concrete, on the first end 302 of the proximal main conveyor boom section 106a, or the hopper and/or first end 400 of the feeder conveyor 104, wherein the material is transported across the first and second main conveyor belts 300, 500.

Next, the process can continue to the step 1008 of positioning the distal main conveyor boom section 106nn. The boom assembly can be used directly, or in an extended configuration. This step may also include revolving the second end 418 of the distal main conveyor boom section 106n approximately 360° with respect to the revolution joint 404. After the distal main conveyor boom section 106n has been rotated or revolved, and adjusted to the necessary or desired elevation, it is said to be in a placement position where the material can flow from an end hose 502 or otherwise be placed by the operator/user in its desired location. As such, the assembly 100 is able to provide effective and efficient placement of the material and an assembly that beneficially has additional and various degrees of freedom when compared to known material placement assemblies. The process may then continue to revolving or retracting the main boom sections such that they are placed back in their initial or storing position and operable to be transported by a vehicle to various locations for subsequent use. The process may then terminate at step 1010. Those skilled in the art will appreciate that alternative steps can be taken without departing from the scope of the invention. For example, in some embodiments, the distal boom section can be operated in its stowed position, without the need to extend other sections.

Although the above-described structures and systems allow a multi-sectioned boom to deliver concrete or other material a distance from the feed point, it is desirable to maintain distal boom section level. To accomplish that the distal boom section must be able to change angle relative to the main boom section(s). FIGS. 11-16 show a multi-sectioned boom conveyor assembly 1100 where the distal boom section is coupled to the main boom section in a hinged arrangement to allow maintaining the distal boom section level while the main boom section can be at an angle to horizontal. In referring to the assembly 1100, any of FIGS. 11-16 may be referenced.

Figure 11:
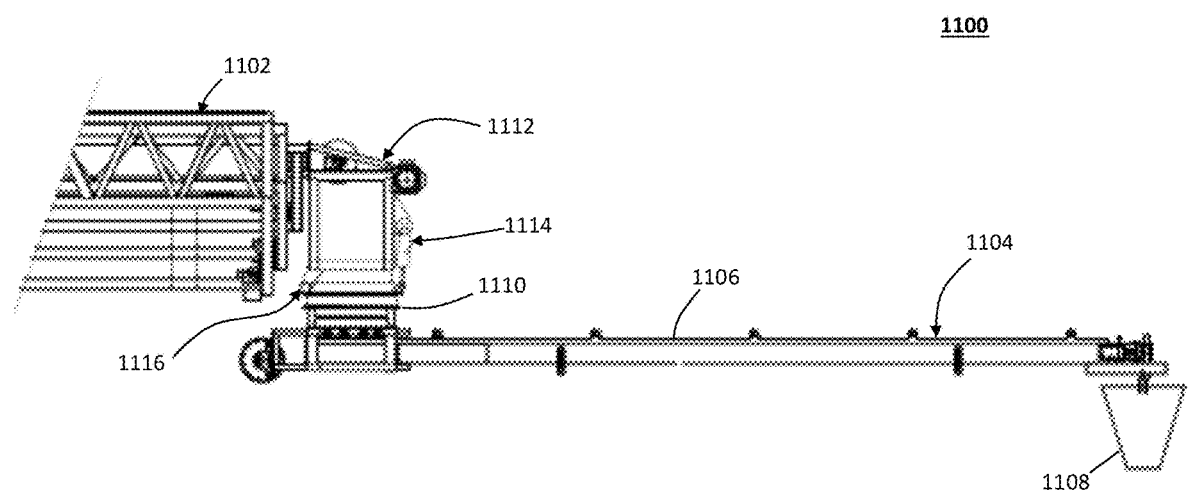
FIG. 11 shows a side view of a portable multi-sectioned boom conveyor assembly having a hinge between boom sections and a distal boom section.

FIG. 11 shows a side view of a portable multi-sectioned boom conveyor assembly 1100 having a hinge between boom sections. The assembly 1100 includes a main boom section 1102 that can be substantially similar to that described in the previous drawings, and is mounted on a vehicle such as a truck, and operated while attached to the vehicle. The main boom section can have multiple sections that extend from each other, as in FIG. 1 (e.g. 106*a-c*). In some embodiments the main boom section 1102 includes a feeder conveyor (e.g. 106*a*) and at least one intermediate boom section (e.g. 106*b*). The main boom section includes at least a first conveyor belt for moving material along the boom assembly, as previously described. The assembly also includes a distal boom section 1104 that includes a second main conveyor belt 1106. The second main conveyor belt 1106 moves material it receives from the main boom section 1102 to a second end and into a dispenser 1108 that directs the material to the intended site. Attached to the end of the main boom section 1102 is a transfer chute section 1112 through which material conveyed by the main boom section 1102 falls to the distal boom section 1104 at the first end of the distal boom section 1104. Specifically the material falls onto the second main conveyor belt to be carried to the second end of the distal boom section 1104 and into the dispenser 1108. The transfer chute section is coupled to a rotatable pass through section 1110 in a hinged manner. The a rotatable pass through section 1110 includes and upper portion 1136 and a lower portion 1138 that are coupled together such that the lower portion 1138 can be rotated with respect to the upper portion 1136. The upper portion 1136 is coupled to the transfer chute section using a hinge arrangement. The lower section 1138 is coupled to the first end of the distal boom section 1104.

The hinge arrangement is achieved by a rear hinge section 1116 that allows the transfer chute section 1112 to change its angle relative to the rotatable pass through section 1110. The rear hinge section 1116 can be a simple pivoting engagement using, for example, a horizontally oriented pin assembly about which to two sections 1112, 1110 pivot with respect to each other. A front hinge section 114 couples the transfer chute section 1112 to the rotatable pass through section 1110 at a front of the transfer chute section 1112, opposite the rear hinge section 1116. The front hinge section 1114, however, allows a change in distance between the front of the transfer chute section 1112 and the rotatable pass through section 1110. An actuator or other driving mechanism is used to adjust the angle of the distal boom section 1104. For example, a hydraulic actuator can connect the transfer chute section 1112 to the upper portion 1136 of the rotatable pass through section 1110. When the main boom section is raised, such that it is an angle relative to level (horizontal), the hydraulic actuator can be extended, allowing the rear hinge section to pivot, and maintain the distal boom section 1104 at a substantially level orientation. Those skilled in the art will appreciate that similar drive mechanisms can be used for adjusting the angle of the distal boom section 1104, such as, for example, a worm gear can be used to drive an sprocket that controls the angle of the distal boom section 1104.

Figure 12:
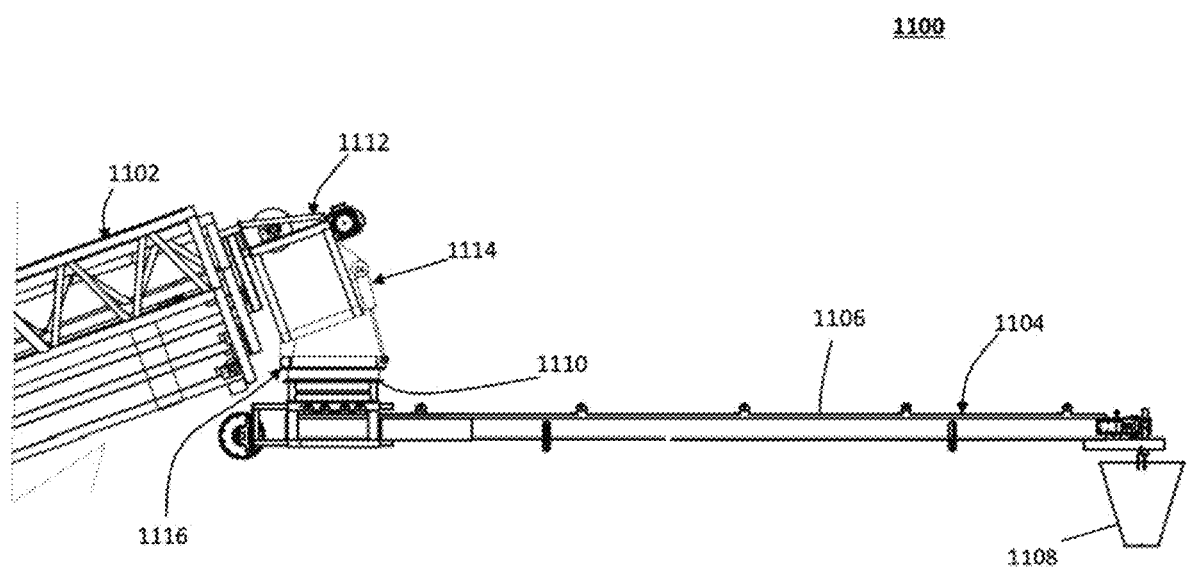
FIG. 12 shows a side view of a portable multi-sectioned boom conveyor assembly having a hinge between boom sections and a distal boom section, with the main boom section at an angle to horizontal.

FIG. 12 shows a side view of a portable multi-sectioned boom conveyor assembly 1100 having a hinge between boom sections, with the main boom section at an angle to horizontal. In this view, the main boom section is raised at an angle to level of about 20 degrees. The front hinge section 1114 is extended to allow the distal boom section 1104 to remain level, or to be moved to a level orientation. The transfer chute section 1112 pivots with respect to the rotatable pass through section 1110 at the rear hinge section 1116. The distal boom section 1104 is maintained at a distance above the ground in this orientation while delivering conveyed material to the dispenser 1108.

FIG. 13 shows a side view of a portable multi-sectioned boom conveyor assembly 1100 having a hinge between boom sections. The rotatable pass through section 1110 allows the distal boom section 1104 to be rotated around to a position under the main boom section 1102, where the boom section 1102, 1104 can be secured on the truck for travel. The main boom section 1102 includes three sections 1148, 1150, 1152. Section 1150 can extend from section 1148, and section 1152 can extend from section 1150. As shown here, the three sections 1148, 1150, 1152 of the main boom section 1102 are collapsed in a telescopic manner for travel. The distal boom section 1104 is rotated by rotating the lower portion 1138 of the rotatable pass through section 1110 with respect to the upper portion 1136 (see FIGS. 14-16) about vertical axis 1300.

Figure 14:
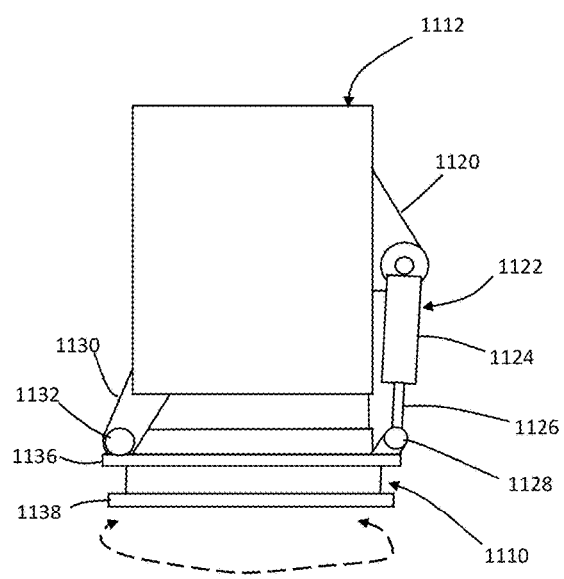
FIG. 14 shows a side view detail of the apparatus between the main and distal boom sections when the main boom section is level.

FIG. 14 shows a side view detail of the apparatus between the main and distal boom sections when the main boom section is level. Here the transfer chute section 1112 and the rotatable pass through section 1110 are shown substantially as in either FIG. 11 or FIG. 13. The rear hinge section 1116 shown in FIGS. 11-13 includes a rear bracket 1130 that extends from the back of the transfer chute section 1112 at a bottom rear of the transfer chute section 1112. The rear bracket 1130 of the transfer chute section 1112 mates with a rear bracket 1132 that extend from the top portion 1136 of the rotatable pass through section 1110. A hinge pin can pass through the brackets 1130, 1132 to retain them together while allowing the brackets 1130, 1132 to pivot about the pin with respect to each other. The rear bracket 1130 can extend to the rear and downward, while rear bracket 1132 can extend upward, and/or to the rear as well. The brackets 1130, 1132 can be duplicated on the right and left sides of the assembly.

Figure 15:
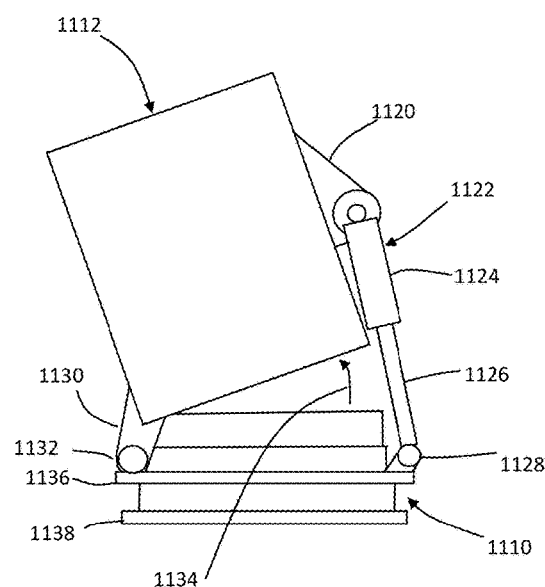
FIG. 15 shows a side view detail of the apparatus between the main and distal boom sections as the apparatus would appear when the main boom section is raised at an angle and the distal boom section is level.

The front hinge section 1114 is comprises of a front bracket 1120 on the front of the transfer chute section that is higher than the rear bracket 1130. The front bracket 1120 is coupled to a corresponding front bracket 1128 on the top portion 1136 of the rotatable pass through section 1110. Connecting the two front brackets 1120, 1128 is an actuator 1122. If a hydraulic actuator is used, it can include a hydraulic cylinder 1124 and actuator arm 1126. The actuator 1122 can be coupled to both, and between, front brackets 1120, 1128. The actuator 1122, when implemented as a hydraulic actuator, can extend or retract the actuator arm 1126 by controlling the amount of hydraulic fluid is in the hydraulic cylinder 1124. The actuator arm 1126 can be extended or retracted to adjust the angle of the distal boom portion with respect to the main boom section. FIG. 15 shows a side view detail of the apparatus between the main and distal boom sections when the main boom section is raised at an angle, with the actuator arm 1126 extended. The transfer chute section 1112 pivots with respect to the rotatable pass through section 1110 at the rear hinge 1116. Although a hydraulic actuator is shown here as one type of actuator that can be used to change the angle of the distal boom portion, it will be appreciated by those skilled in the art that other type of actuators can be used equivalently.

Figure 16:
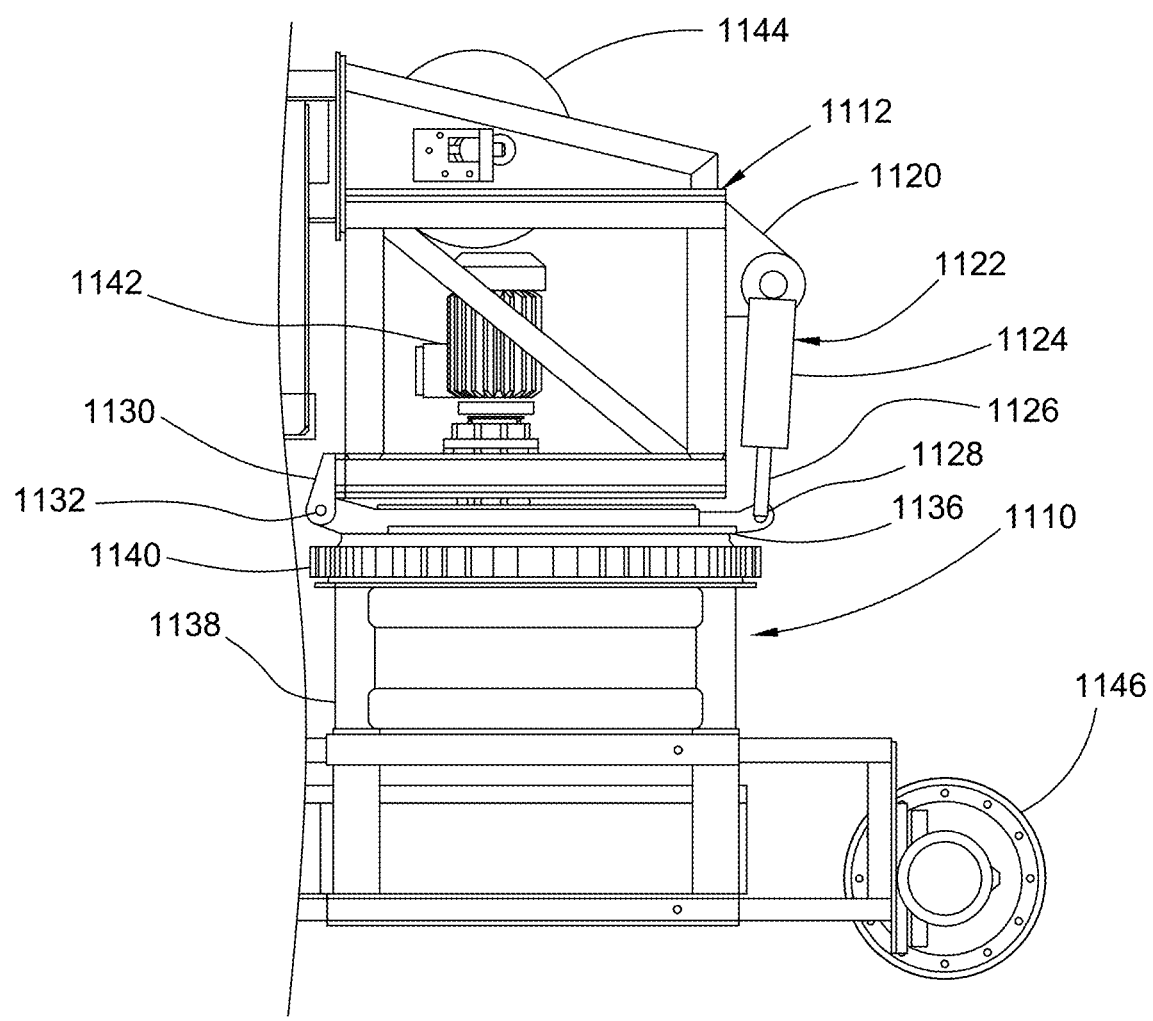
FIG. 16 shows a side view detail of the apparatus between the main and distal boom sections.
Figure 17:
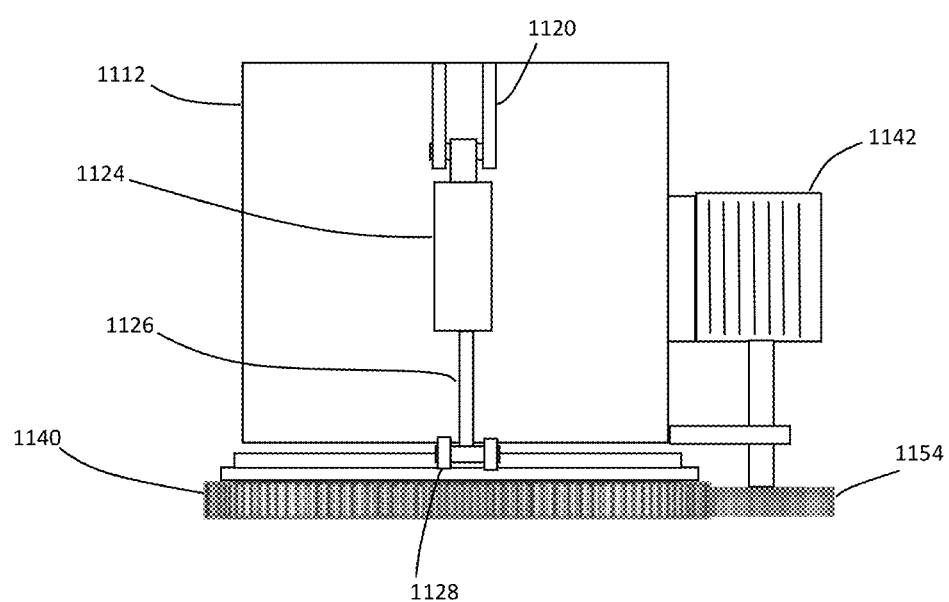
FIG. 17 shows a front view of relevant portions of the drive system for rotating the distal boom section, in accordance with some embodiments.

FIG. 16 shows a side view detail of the apparatus between the main and distal boom sections. FIG. 17 shows a front view of relevant portions of the drive system for rotating the distal boom section. In particular, in FIG. 16, the lower portion 1138 of the rotatable pass through section 1110 has an external sprocket gear 1140 on the outside of the lower portion 1138, at a top of the lower portion 1138 The upper portion 1136 can be coupled the lower portion 1138 on a circular, rotating bearing assembly that is sealed. The external gear 1140 is driven by a motor 1142 that drives a sprocket 1154. As seen in FIG. 17, the motor 1142 is on the outside of the transfer chute section 1112. As will be appreciated, other drive arrangements can be used equivalently. While the motor 1142 can drive the sprocket 1154 directly, it can also be arranged to operably drive the sprocket 1154 through a chain around the sprocket 1154 that is driven by a gear on a shaft of the motor 1142, or there can be an intermediate gear or other transmission. In some embodiments a belt may be used. As can be further seen, a roller/motor assembly 1144 drives or assists the first main conveyor belt on the main conveyor boom. Similarly, a motor 1146 drives the second conveyor belt on the distal boom section.

As can be seen in FIG. 12, with the boom assembly extended to raise the distal boom section 1104 to a desired height, and a distance away from the truck/feed point of the assembly, the distal boom section 1104 cannot rotate in a complete circle as it will encounter the main boom section 1102. It would be preferable to eliminate this interference to allow the distal boom section to rotate in a full circle (e.g. 360 degrees). This can be accomplished by providing a hinge in the main boom section that declines a portion of the main boom section such that the declined portion is also horizontally oriented; then the distal boom section can rotate under the main boom section freely.

Figure 18:
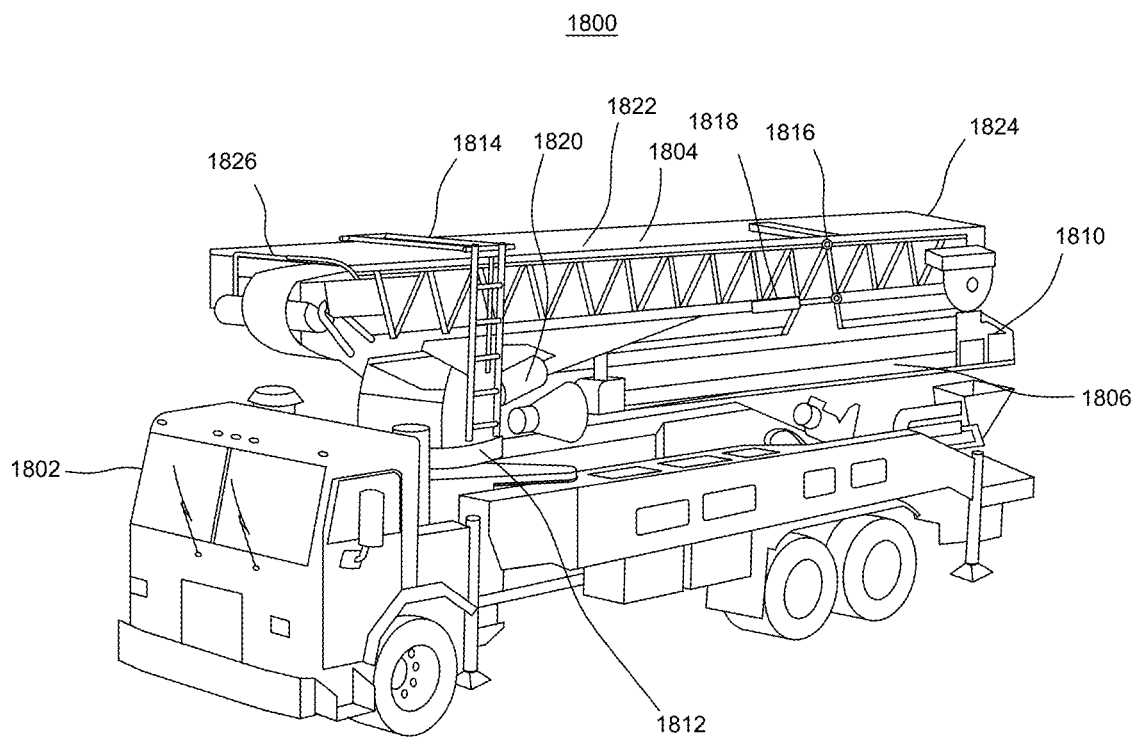
FIG. 18 shows a perspective view of a portable telescoping boom assembly in a transport position, in accordance with some embodiments.

FIG. 18 shows a perspective view of a portable telescoping boom assembly 1800 in a transport position, in accordance with some embodiments. The portable boom assembly can be provided on a truck 1802 and includes a main boom section 1804 that includes one or more telescoping boom sections that can extend from the main boom section in a telescoping arrangement. However, unlike the boom sections described in reference to FIGS. 1-9, in which the boom sections collapse into a stack of boom sections, the telescopic boom sections described herein in reference to FIGS. 18-26 refer to trussed sections in which the intermediate sections withdraw into, and extend from, within a larger boom section, rather than stacking the boom sections. This allows the upper or top of all of the boom section to be more closely aligned, which allows for a single belt to be routed over multiple sections with no substantial interruption between the boom sections, either in belt routing or in height differences between sections.

The distal boom section 1806 is rotated to sit under the main boom assembly 1804 for transport. The main boom section 1804 is coupled to the distal boom section 1806 by a rotatable pass through section 1810 that is substantially similar to rotatable pass though section 1110. The main boom section 1804 is mounted in the truck 1802 on a rotatable base joint 1812 that is able to turn the entire boom assembly 1804, 1806 around the base joint 1812. The boom assembly 1804, 1806 is fed at a feed point 1814 that can be directly over the rotatable base joint 1812 and is proximate to the first end 1826 of the first boom section 1822. An actuator 1820, such as, for example, a hydraulic actuator, can be used to raise and lower the main boom section 1804, and with it, the distal boom section 1806. The actuator 1820 can be a first boom section actuator as it is coupled between the base joint 1812 and the first boom section 1822 of the main boom section 1804. Along the first boom section 1822 there is a hinge 1816 in the first boom section 1822 that is located between the feed point 1814 and a second end 1824 of the first boom section 1822. The portion of the first boom section 1822 between the hinge 1816 and the second end 1824 is referred to as a declination portion as it can be declined by a hinge actuator 1818 that is coupled between the declination potion and the fixed portion that is coupled to the base joint 1812.

Figure 19:
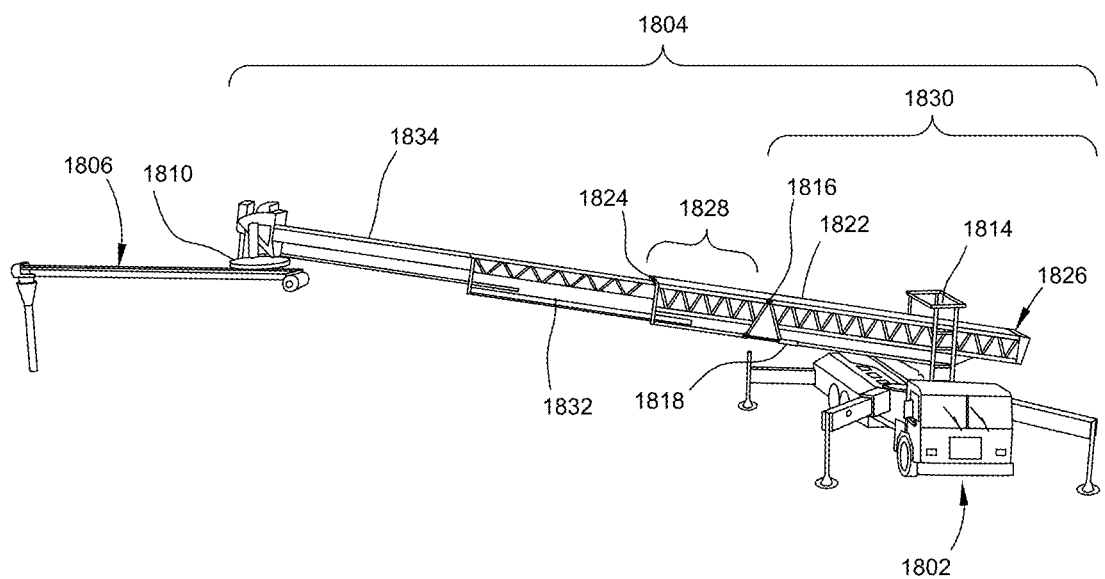
FIG. 19 shows a portable telescoping boom assembly for conveying material in an extended position, in accordance with some embodiments.

FIGS. 19-22 show various sections of the portable telescoping boom assembly. FIG. 19 shows the portable telescoping boom assembly in an extended position. In the present embodiment, the main boom section 1804 includes the first boom section 1822 that has the fixed portion 1830 and the declination portion 1828 which are joined at the hinge 1816 and hinge actuator 1818. An intermediate telescoping section 1832 is telescopically mounted to the first boom section 1822 and is extendible in a coaxial direction. That is, the intermediate telescoping section 1832 can be moved along the axial direction of the first boom section 1822 between and extended position (as shown here) and a withdrawn position (as in FIG. 18). The first boom section 1822 is a trussed boom section having two side that are trussed. The intermediate telescoping boom section 1832 can also be a trussed boom section, and withdraws into, and extends from within, the first boom section 1822, as opposed to the boom sections being in a stack. Using the trussed boom sections allows the top of the boom sections to be more closely aligned in height, relative to each other, if not also relative to the ground, at the transitions from one boom section to the next. This provides much less disturbance of the material as it is conveyed across sections compared to a stacked boom section arrangement.

Figure 20:
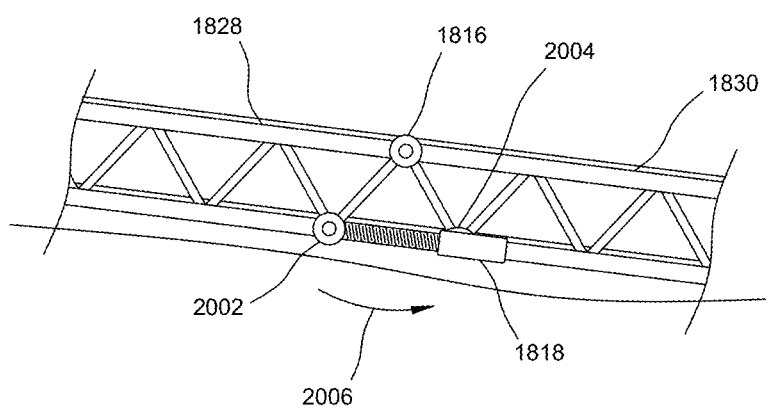
FIG. 20 shows a side view of a main boom section of a portable telescoping boom assembly for conveying material, and having a hinge, in accordance with some embodiments.
Figure 21:
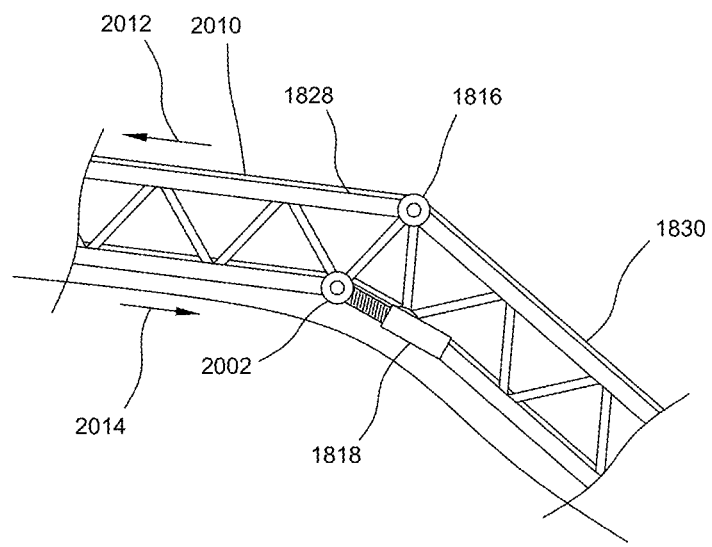
FIG. 21 shows a side view of a main boom section of a portable telescoping boom assembly for conveying material, and having a hinge, in accordance with some embodiments.

A distal telescoping section 1834 is mounted in the intermediate telescoping section 1832 in substantially the same way that the intermediate telescoping section 1832 is mounted in the first boom section 1822, and can be moved between extended and withdrawn positions relative to the intermediate telescoping boom section 1832. As shown here, the main boom assembly 1804 is extended to carry material to the distal section 1806 for deposit on a work site. Further, the main boom assembly is raised, meaning the second end 1824 of the first boom section, and hence the intermediate and distal telescoping boom sections 1832, 1834, are elevated and inclined at some angle. While the portable boom assembly can be operated in this configuration, as in FIG. 12, the distal boom section 1806 cannot turn in a complete circle, which may limit application of material. Further, until the intermediate telescoping section 1832 is sufficiently extended, the hinge actuator 1818 cannot be operated to decline the declination portion 1828. FIG. 20 shows a region of the first boom section 1822 including the hinge 1816 while the fixed portion 1830 and the declination portion 1828 remain aligned, axially. The hinge actuator 1818 is attached to the bottom of the declination portion at a first lower pivot point 2002 while the hinge actuator 1818 can be likewise mounted on a pivot 2004. The hinge actuator 1818 can include a pair of identical actuator elements disposed on each side of the first boom section 1822 that work together. The hinge 1816 is shown at the top of the first boom section, but can also be located in the middle or at the bottom (in the vertical direction). The hinge actuator 1818 allows the declination portion 1828 to be lowered to a horizontal orientation when the fixed portion 1830 of the first boom section 1822 is raised by the first actuator 1820. FIG. 21 shows the same region of the first boom section 1822 as in FIG. 20, but with the declination portion 1828 declined to a horizontal orientation, which allows the distal boom section 1806 to rotate in a complete circle. Further, in FIG. 21, the conveyor belt 2010 is shown traversing the top of the first boom section in a first direction 2012, and returning in the opposite direction 2014 along the bottom of the first boom section 1822. In FIG. 21, the hinge actuator 1818 has declined the declination portion 1828 and has pivoted on the pivot mounts 2002, 2004 on the declination and fixed portions 1828, 1830.

Figure 22:
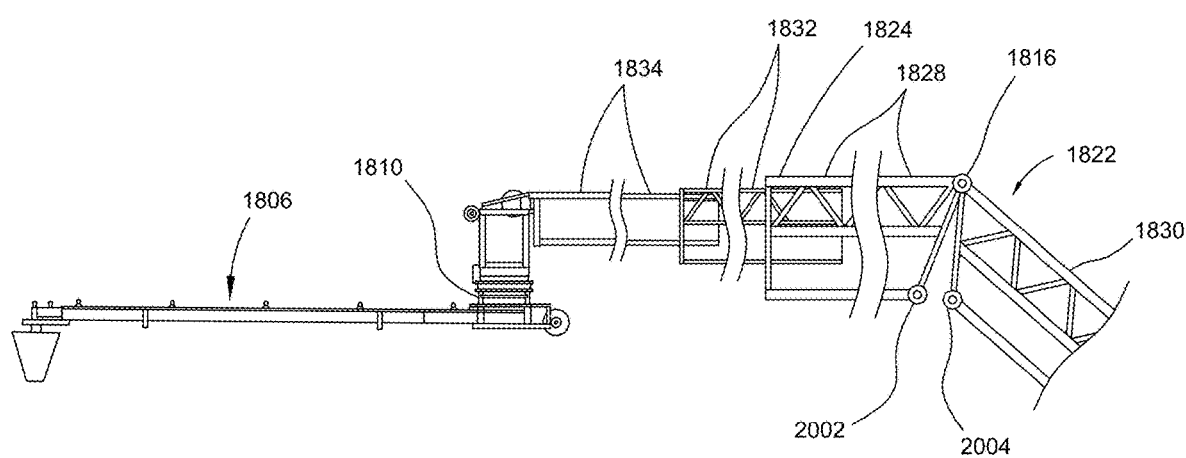
FIG. 22 shows a broken view of an extended portable telescoping boom assembly for conveying material with the extended boom portions declined at the hinge, in accordance with some embodiments.

FIG. 22 shows a broken view of the extended portable telescoping boom assembly 1804 for conveying material with the extended boom portions declined at the hinge. In order to show more detail of the telescoping and fixed sections with the boom assembly in the extended position, the drawing here provides breaks at the first, intermediate, and distal telescoping boom sections 1822, 1832, 1834. The intermediate telescoping section 1832 can be mounted on sliding elements, rails or tracks near the second end 1824 of the first boom section 1822. In general, the intermediate boom section 1832 will be narrower, in the horizontal direction perpendicular to the lengthwise direction, and the first boom section 1822, and fit within the first boom section 1822. Likewise, the distal telescoping boom section 1834 will be narrower still to fit within the intermediate telescoping boom section 1832. The hinge actuator 1818 is not shown here, although the declination portion 1828 of the first boom section 1822 is shown declined to a horizontal orientation while the fixed portion 1830 is inclined, thereby raising the declination portion 1828 along with the intermediate and distal telescoping portions 1832, 1834, and the distal boom section 1806.

Figure 23:
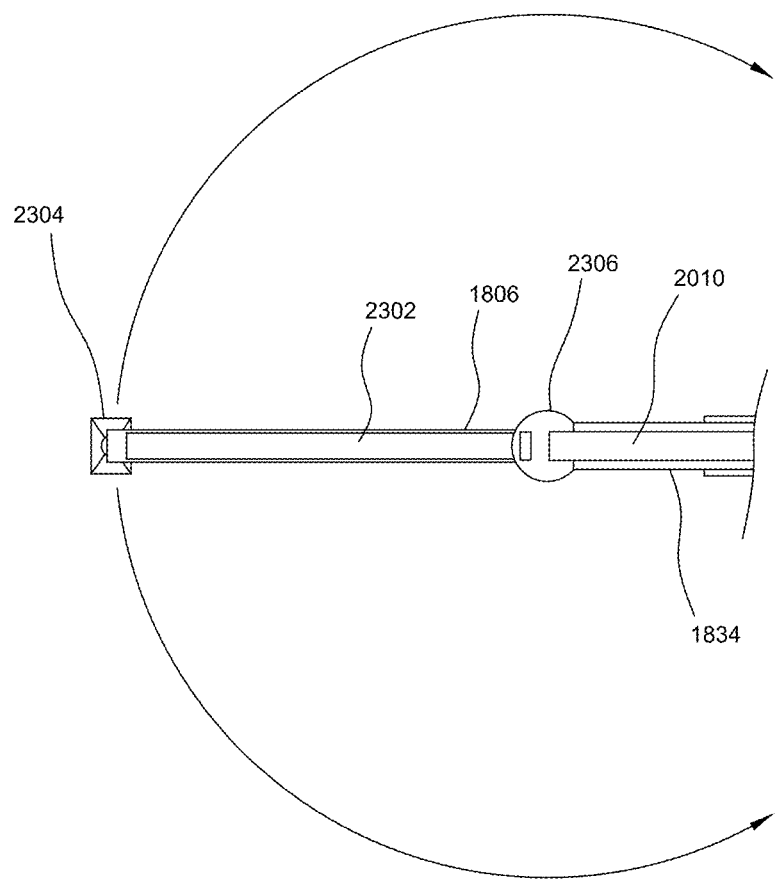
FIG. 23 shows a top of a distal boom portion in an extended portable telescoping boom assembly for conveying material with the extended boom portions declined at the hinge, in accordance with some embodiments.

FIG. 23 shows a top of a distal boom portion 1806 with the main boom assembly in an extended position, as in FIG. 22. Since the distal telescoping boom section 1834 is in a horizontal position, the distal boom section 1806 can rotate in a complete circle and pass under the distal telescoping boom section 1834. As a result, the dispenser 2304 can be rotated to any position along the circle, including under the distal telescoping boom section 1834. The distal boom section 1806 includes its own conveyor belt 2302 to move material from the transfer chute section 2306 to the dispenser 2304. The transfer chute section 2306 receives material from main conveyor belt 2010, which is a single belt routed along the entirety of the main boom assembly.

Figure 24:
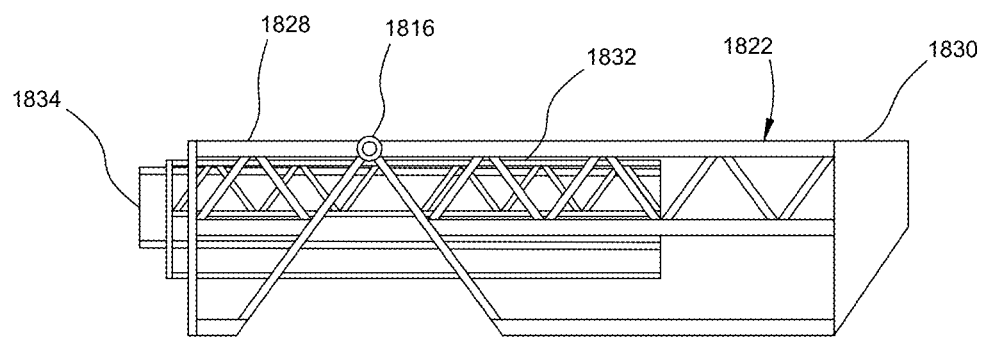
FIG. 24 shows a representation of a withdrawn multi-section portable telescoping boom assembly having a hinged main section for declining the extended portion of the boom assembly, in accordance with some embodiments.
Figure 25:
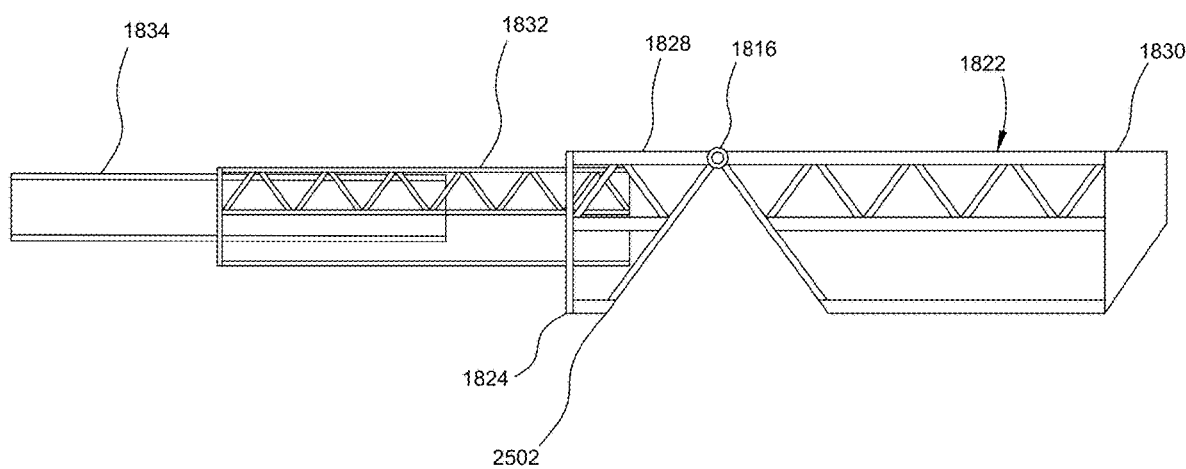
FIG. 25 shows a representation of an extended multi-section portable telescoping boom assembly having a hinged main section, in accordance with some embodiments.
Figure 26:
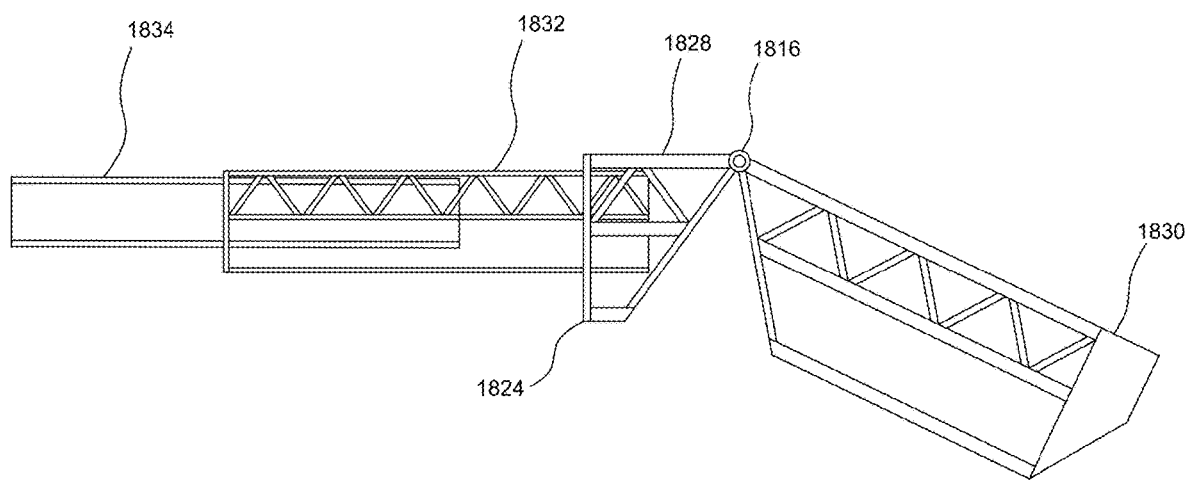
FIG. 26 shows a representation of the extended multi-section portable telescoping boom assembly of FIG. 25 with the extended portion declined at the hinge.

FIG. 24 shows a representation of a withdrawn multi-section portable telescoping boom assembly having a hinged main section 1822 for declining the extended portion of the boom assembly, in accordance with some embodiments. The relative outlines of the first section 1822, the intermediate telescoping section 1832, and distal telescoping section 1834 are shown in a withdrawn position. That is, distal telescoping section 1834 is withdrawn into intermediate telescoping section 1832 which is withdrawn into the first boom section 1822. The hinge 1816 indicates where the first boom section 1822 is hinged to allow the declination portion 1828 to decline. The telescoping boom assembly can use a single belt that is routed over the top of the entire telescoping boom assembly, and returns along the bottom. That is, one single conveyor belt is routed over the first boom section 1822, the intermediate telescoping boom section 1832, and the distal telescoping section 1834. This eliminates the need to each section of the boom assembly to have its own conveyor belt, with its own drive motor. In FIG. 25 the main boom assembly sections are shown in a fully extended position. Note that the rear end 2502 of the intermediate telescoping section 1832 has moved between the hinge 1816 and the second end 1824 of the first boom section 1822. This allows the declination portion 1828 to be declined as shown in FIG. 26.

A telescoping boom assembly for conveyance of material has been disclosed and has a distal section that rotates about its feed point, and a hinged section in the main boom assembly that can decline the extended portions of the boom assembly so that the distal boom section rotates in a level, horizontal plane, which allows the maximum area of distribution of the material from the telescoping boom assembly. By leveling the extended portion of the main boom assembly, the distal boom section can rotate under the main boom assembly, which reduces the need to move the main boom sections when distributing the material.

What is claimed is:

1. A portable multi-sectioned telescoping conveyor boom assembly, comprising:
    a first boom section that is coupled at a feed point to a rotatable base joint about which the first boom section can be rotated, the feed point being proximate to a first end of the first boom section;
    at least one telescoping boom section that is telescopically mounted in the first boom section so as to be alternatively extended from the first boom section in a coaxial alignment from a second end of the first boom section, or withdrawn into the first boom section at the second end of the first boom section;
    wherein the first boom section comprises a hinge between the feed point and the second end of the first boom section, wherein a declination portion of the first boom section is defined between the hinge and the second end of the first boom section and a fixed portion is defined between the hinge and the first end of the first boom section;
    a first boom section actuator operable to alternatively raise and lower the first boom section between a horizontal position and a raised position in which the second end of the first boom section is elevated; and
    a hinge actuator coupled between a pivot point of the fixed portion and a pivot point of the declination portion and wherein the hinge actuator is operable to decline the declination portion relative to the fixed portion.

2. The portable multi-sectioned telescoping conveyor boom assembly of claim 1, further comprising a main conveyor belt routed from the first end of the first boom section over a top of the first boom section and the at least one telescoping boom section to a distal end of the at least one boom section.

3. The portable multi-sectioned telescoping conveyor boom assembly of claim 2, further comprising:
    a transfer chute section mounted at the distal end of the at least one telescoping boom section that is situated to receive material from the main conveyor belt and direct the material downward;
    a rotatable pass through section having an upper portion and a lower portion, wherein the lower portion is coupled to the upper portion about a revolution joint that allows the lower portion to rotate with respect to the upper portion, and wherein the upper portion is coupled to the transfer chute section in a hinged manner; and
    a distal conveyor boom section that is coupled to the lower portion of the rotatable pass through section, the distal conveyor boom section having a distal conveyor belt spanning from a first end of the distal conveyor boom section to a second end of the distal conveyor boom section.

4. The portable multi-sectioned telescoping conveyor boom assembly of claim 3, wherein the hinge actuator is operable to decline the declination portion of the first boom section when the distal conveyor boom section is operating, in order to keep the distal conveyor boom section in a horizontal orientation.

5. The portable multi-sectioned telescoping conveyor boom assembly of claim 1, wherein the at least one telescoping boom section comprises two telescoping boom sections including an intermediate telescoping boom section that is telescopically mounted in the first boom section, and a distal boom section that is telescopically mounted in the intermediate telescoping boom section.

6. A portable multi-sectioned boom conveyor assembly, comprising:
 a main conveyor boom section having a first portion and at least one extendible portion arranged in a telescoping coaxial arrangement with the first portion, the main conveyor boom section having a first main conveyor belt and a distal end of the at least one extendible portion;
 wherein the first portion of the main conveyor boom section comprises a hinge between a feed point of the fixed first portion and a second end of the fixed first portion, wherein a declination portion of the fixed first portion is defined between the hinge and the second end of the first portion, a fixed portion is defined between a first end of the first portion and the hinge, and wherein the declination portion is moveable about the hinge in a vertical direction;
 a fixed actuator operable to alternatively raise and lower the first portion between a horizontal position and a raised position in which the second end of the first portion is elevated;
 a hinge actuator coupled to the declination portion at a pivot point of the declination portion and a pivot point of the fixed portion, and that is operable to decline the declination portion relative to the fixed portion; and
 wherein the first main conveyor belt is routed in a single continuous circuit over a top of the main conveyor boom section.

7. The portable multi-sectioned boom conveyor assembly of claim 6, wherein the first portion of the main conveyor boom assembly is mounted, at the feed point, on a rotatable base joint about which the main conveyor boom section can be rotated.

8. The portable multi-sectioned boom conveyor assembly of claim 6, further comprising:
 a transfer chute section mounted at the distal end of the main conveyor boom section that is positioned to receive a material from the first main conveyor belt and direct the material downward;
 a rotatable pass through section having an upper portion and a lower portion, wherein the lower portion is coupled to the upper portion about a revolution joint that allows the lower portion to rotate with respect to the upper portion, and wherein the upper portion is coupled to the transfer chute section in a hinged manner, wherein the rotatable pass through section is configured to allow the material passing through the transfer chute section to also pass through the rotatable pass through section; and
 a distal conveyor boom section that is coupled to the lower portion of the rotatable pass through section, the distal conveyor boom section having a second main conveyor belt spanning from a first end of the distal conveyor boom section to a second end of the distal conveyor boom section, wherein the distal conveyor boom section is movable between a position under the main conveyor boom section and an extended position in which the distal conveyor boom section is extended forward of the distal end of the main conveyor boom section.

9. The portable multi-sectioned boom conveyor assembly of claim 8, wherein the top portion of the rotatable pass through section has a hinge bracket that is coupled to a hinge bracket of the transfer chute section such the transfer chute section and rotatable pass through section pivot about their respective hinge brackets.

10. The portable multi-sectioned boom conveyor assembly of claim 6, wherein the hinge actuator comprises a first linear hydraulic actuator on a first side of the first portion and a second linear hydraulic actuator on a second side of the first portion.

11. A method of operating portable multi-sectioned boom conveyor assembly, comprising:
 providing a main conveyor boom section having a first portion and at least one extendible portion arranged in a telescoping arrangement with the first portion, the main conveyor boom section having a first main conveyor belt and a distal end of the at least one extendible portion, wherein the first portion of the main conveyor boom section comprises a hinge between a feed point of the first portion and a second end of the first portion at a top of the first portion, wherein a declination portion of the first portion is defined between the hinge and the second end of the first portion, a fixed portion is defined between the hinge and a first end of the first portion, and wherein the declination portion is moveable about the hinge in a vertical direction;
 providing a fixed actuator operable to alternatively raise and lower the fixed portion between a horizontal position and a raised position in which the second end of the first portion is elevated relative to the first end;
 providing a hinge actuator coupled to the declination portion that is operable to decline the declination portion to a horizontal position when the first portion is in the raised position, wherein the first main conveyor belt is routed in a single continuous circuit over a top of the main conveyor boom section including the first portion and the at least one extendible section;
 raising the main conveyor boom section until the hinge is at a desired height;
 extending the at least one extendible portion telescopically from the first portion; and
 operating the hinge actuator to lower the declination portion to the horizontal position.

12. The method of claim 11, further comprising:
 receiving a material on the first main conveyor belt at the feed point;
 moving the first main conveyor belt to move the material from the feed point along the main conveyor boom section to a distal end of the main conveyor boom section and into a transfer chute to a distal conveyor boom section that is rotatable relative to the distal end of the main conveyor boom section.

* * * * *